United States Patent
Holness et al.

(10) Patent No.: US 10,263,867 B2
(45) Date of Patent: Apr. 16, 2019

(54) MEASURING FRAME LOSS

(71) Applicant: Ciena Corporation, Hanover, MD (US)

(72) Inventors: Marc Holness, Kanata (CA); Cory Gordon, Spokane Valley, WA (US)

(73) Assignee: Ciena Corporation, Hanover, MD (US)

( * ) Notice: Subject to any disclaimer, the term of this patent is extended or adjusted under 35 U.S.C. 154(b) by 393 days.

(21) Appl. No.: 14/886,721

(22) Filed: Oct. 19, 2015

(65) Prior Publication Data

US 2017/0111251 A1   Apr. 20, 2017

(51) Int. Cl.
*H04L 12/26* (2006.01)
*H04L 12/939* (2013.01)

(52) U.S. Cl.
CPC ...... *H04L 43/0835* (2013.01); *H04L 43/0841* (2013.01); *H04L 43/10* (2013.01); *H04L 49/552* (2013.01)

(58) Field of Classification Search
None
See application file for complete search history.

(56) References Cited

U.S. PATENT DOCUMENTS

| | | | |
|---|---|---|---|
| 2008/0080390 A1* | 4/2008 | Ebuchi | H04L 43/0829 370/253 |
| 2010/0008250 A1 | 1/2010 | Nomura et al. | |
| 2014/0029442 A1* | 1/2014 | Wallman | H04L 69/22 370/241.1 |
| 2014/0307561 A1 | 10/2014 | Wan et al. | |

FOREIGN PATENT DOCUMENTS

EP   2712120 A1   3/2014

OTHER PUBLICATIONS

Extended European Search Report in corresponding European Application No. 16193994.7-1862 dated Feb. 16, 2017 (7 pages).
"Measuring Frame Loss—SLM/SLR"; https://wiki.mef.net/pages/viewpage.action?pageId=25952551; Nov. 26, 2013; Retrieved on Oct. 16, 2015 (2 pages).

* cited by examiner

*Primary Examiner* — Adnan Baig
(74) *Attorney, Agent, or Firm* — Clements Bernard Walker PLLC; Christopher L. Bernard; Lawrence A. Baratta, Jr.

(57) ABSTRACT

A method for measuring frame loss on a connection between a near-device (NED) and a far-end device (FED). The method includes: placing, on the connection, multiple test frames having a plurality of sequence numbers; obtaining, from the connection, a first reflected test frame having a first sequence number, a first FED receiving counter value from the FED, and an initial FED received count from the FED; obtaining, from the connection, a second reflected test frame having a second sequence number, a second FED receiving counter value from the FED, and the initial FED received count from the FED; and calculating a one-way frame loss value on the connection based on the second sequence number and the initial FED received count.

20 Claims, 10 Drawing Sheets

MEASURING FRAME LOSS

BACKGROUND

Network connections between computing devices are ubiquitous. However, these network connections are not perfect. In other words, data to be exchanged between the two computing devices may be lost (i.e., dropped) by the network connection, which impacts the performance of one or both of the computing devices. Accordingly, measuring the loss on a network connection is of great importance.

SUMMARY

In general, in one aspect, the invention relates to a method for measuring frame loss on a network connection between a near-device (NED) and a far-end device (FED) during a measurement period. The method comprises: placing, by the NED and on the network connection, a plurality of test frames comprising a plurality of sequence numbers; obtaining, by the NED and from the network connection, a first reflected test frame comprising a first sequence number, a first FED receiving counter value from the FED, and an initial FED received count for the measurement period from the FED; obtaining, by the NED and from the network connection, a second reflected test frame comprising a second sequence number, a second FED receiving counter value from the FED, and the initial FED received count for the measurement period from the FED, wherein the first reflected test frame and the second reflected test frame are placed on the network connection by the FED; and calculating, by the NED, a one-way frame loss value on the network connection during the measurement period based on the second sequence number and the initial FED received count.

In general, in one aspect, the invention relates to a non-transitory computer readable medium (CRM) storing instructions for measuring frame loss on a network connection between a near-device (NED) and a far-end device (FED) during a measurement period. The instructions comprise functionality for: placing, by the NED and on the network connection, a plurality of test frames comprising a plurality of sequence numbers; obtaining, by the NED and from the network connection, a first reflected test frame comprising a first sequence number, a first FED receiving counter value from the FED, and an initial FED received count for the measurement period from the FED; obtaining, by the NED and from the network connection, a second reflected test frame comprising a second sequence number, a second FED receiving count value from the FED, and the initial FED received count for the measurement period from the FED, wherein the first reflected test frame and the second reflected test frame are placed on the network connection by the FED; and calculating, by the NED, a one-way frame loss value for the network connection during the measurement period based on the second sequence number and the initial FED received count value.

In general, in one aspect, the invention relates to a system for measuring frame loss on a network connection between a near-device (NED) and a far-end device (FED) during a measurement period. The system comprises: a frame generator located within the NED and comprising circuitry configured to place, on the network connection, a plurality of test frames comprising a plurality of sequence numbers; and a frame collector located within the NED and comprising circuitry configured to: obtain, from the network connection, a first reflected test frame comprising a first sequence number, a FED receiving counter value from the FED, and an initial FED received count for the measurement period from the FED; obtain, from the network connection, a second reflected test frame comprising a second sequence number, a second FED receiving counter value from the FED, and the initial FED received count for the measurement period from the FED; and calculate a one-way frame loss value for the network connection during the measurement period based on the second sequence number and the initial FED received count.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system, a method, and a non-transitory computer readable medium (CRM) for measuring frame loss on a network connection between a near-device (NED) and a far-end device (FED) during a measurement period. The NED generates test frames including sequence numbers and places the test frames on the network connection for transit to the FED. Later, the NED obtains reflected test frames sent by the FED over the network connection. Each of the reflected test frames may be a test frame that has been populated, by the FED, with at least an initial FED received count for the measurement period. The NED calculates roundtrip frame loss, one-way frame loss from the NED to the FED, one-way frame loss from the FED to the NED, and/or various frame loss ratios based on the content in the reflected test frames and the NED receiving counter values.

Figure 1A:
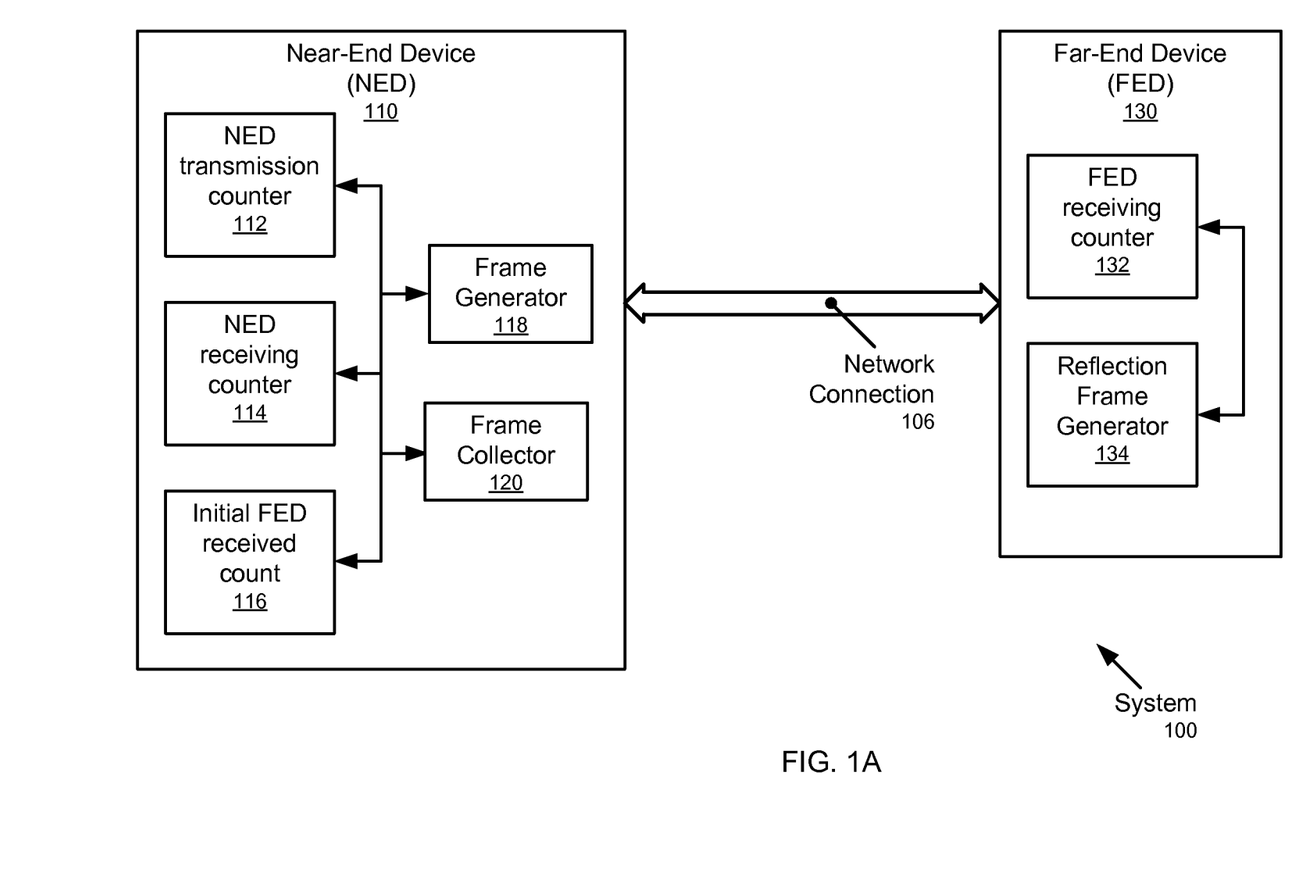
FIG. 1A shows a system in accordance with one or more embodiments of the invention.

FIG. 1A shows a system (100) in accordance with one or more embodiments of the invention. As shown in FIG. 1, the system (100) includes multiple computing devices (i.e., near-end device (110), far-end device (130)) linked by a network connection (106). Each of the computing devices (110, 130) may correspond to a desktop personal computer (PC), a kiosk, a server, a mainframe, a cable box, a smart phone, a router, a switch, a tablet PC, a laptop, an e-reader, a mobile device, etc. The network connection (106) may correspond to a network of any size having wired and/or wireless segments. The network connection (106) may be an Ethernet connection.

In one or more embodiments of the invention, the NED (110) transmits test frames to the FED (130) over the network connection (106). The FED (130) responds by transmitting reflected test frames to the NED (110) over the network connection (106). The NED (110) is able to calculate roundtrip frame loss, one-way frame loss from the NED (110) to the FED (130), one-way frame loss from the FED(130) to the NED (110), and/or various loss ratios based on at least the content in the reflected test frames.

In one or more embodiments of the invention, the NED (110) has various components including a NED transmission counter (112), a NED receiving counter (114), an initial FED received count (116), a frame generator (118), and a frame collector (120). Each of these components (112, 114, 116, 118, 120) may be implemented in software, hardware (i.e., circuitry), firmware, or any combination thereof. Further, although the NED transmission counter (112), the NED receiving counter (114), and the initial FED received count (116) are shown as being external to the frame generator (118) and the frame collector (120), in other embodiments, each of the NED transmission counter (112), the NED receiving counter (114), and the initial received count (116) may be internal to the frame generator (118) or the frame collector (120).

In one or more embodiments of the invention, the NED device (110) includes the NED transmission counter (112). The NED transmission counter (112) counts the number of test frames that have been placed by the NED device (110) on the network connection (106) for transmission to the FED (130). The NED transmission counter (112) may be incremented (e.g., by one) each time a test frame is placed on the network connection (106).

In one or more embodiments of the invention, NED (110) includes the NED receiving counter (114). The NED receiving counter (114) counts the number of reflected test frames that have been obtained, by the NED (110), from the network connection (106). The NED receiving counter (114) may be incremented (e.g., by one) each time a reflected test frame is obtained, by the NED (110), from the network connection (106).

In one or more embodiments of the invention, the NED (110) stores the initial FED received count (116). The initial FED received count (116) may be extracted from any of the reflected test frames obtained, by the NED (110), from the network connection (106) during the measurement period. The initial FED received count (116) is discussed below.

In one or more embodiments of the invention, the NED (110) includes the frame generator (118). The frame generator is configured to generate test frames for placement on the network connection (106). Each test frame includes a sequence number for the measurement period and the current NED transmission counter value.

In one or more embodiments of the invention, the FED (130) has various components including a FED receiving counter (132) and a reflected frame generator (138). Each of these components (132, 138) may be implemented in software, hardware (i.e., circuitry), firmware, or any combination thereof. Further, although the FED receiving counter (132) is shown as being external to the reflected frame generator (118), in other embodiments, the FED receiving counter (132) is internal to the reflected frame generator (138).

In one or more embodiments of the invention, the FED (130) includes the FED receiving counter (132). The FED receiving counter (132) counts the number of test frames that have been received by the FED (130). The FED receiving counter (132) may be incremented (e.g., by one) each time a test frame is obtained, by the FED (130), on the network connection (106).

In one or more embodiments of the invention, the FED (130) includes the reflected frame generator (138). The reflected frame generator (138) is configured to generate reflected test frames for placement on the network connection (106). Each reflected test frame includes the current FED receiving counter value and an initial FED received count. The initial FED received count is the FED receiving counter value after the first test frame for the measurement period is received by FED (130). The initial FED received count is the same for all reflected test frames during the measurement period. In one or more embodiments, the reflected frame generator (138) generates the reflected test frame by populating the received test frame with the current FED receiving counter value and the initial FED received count.

Those skilled in the art, having the benefit of this detailed description, will appreciate that since the FED (130) generates a reflected test frame for each test frame that is received, the FED receiving counter value also equals the number of reflected test frames sent by the FED (130).

Referring back to the NED (110), in one or more embodiments, the NED (110) includes the frame collector (120). The frame collector (120) is configured to obtain reflected test frames from the network connection (106). Further, the frame collector (120) is configured to terminate the transmission of test frames once a minimum number (i.e., at least two) of reflected test frames have been obtain by the NED (110). Further, the frame collector is configured to extract content from the reflected test frames and read NED receiving counter values. Further still, the frame collector (120) is configured to calculate one or more frame loss values based on the content extracted from the reflected test frames, the initial FED received count (116), and/or the NED receiving counter values (114). Example frame loss values include roundtrip frame loss, one-way frame loss from the NED (110) to the FED (130), one-way frame loss from the FED (130) to the NED (110), and/or various ratios based on these frame loss values for the measurement period.

Although FIG. 1A shows the NED (110) as having five components (112, 114, 116, 118, 120), in other embodiments of the invention, one or more components may be duplicated. Further, two or more components may be combined into a single component. Although FIG. 1A shows the FED (130) as having two components (132, 138), in other embodiments of the invention, one or more components may be duplicated. Further, two or more components may be combined into a single component. Both the NED (110) and the FED (130) may have additional components (not shown).

Figure 1B:
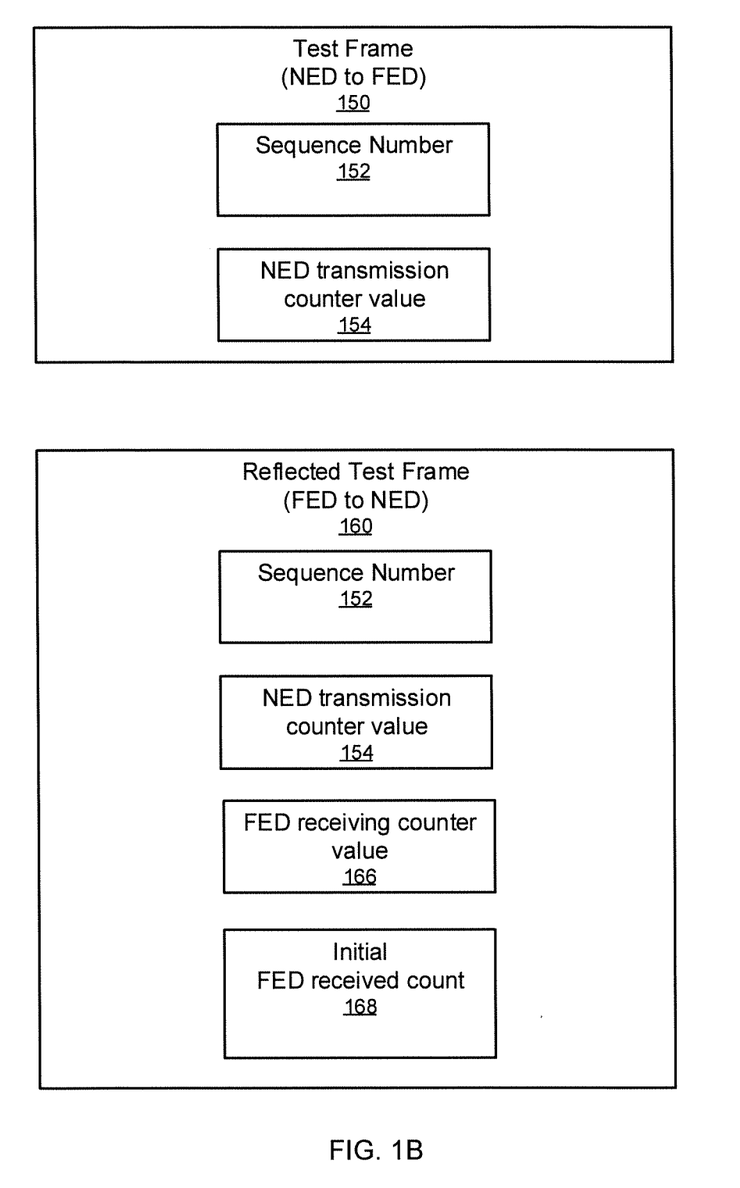
FIG. 1B shows a test frame and a reflected test frame in accordance with one or more embodiments of the invention.

FIG. 1B shows a test frame (150) and a reflected test frame (160) in accordance with one or more embodiments of the invention. As discussed above, the test frame (150) is sent from the NED (110) to the FED (130) over the network connection (106). As also discussed above, the reflected test frame (160) is sent from the FED (130) to the NED (110) over the network connection (106). The reflected test frame (160) is generated based on the test frame (150). As shown in FIG. 1B, the reflected test frame (160) is essentially the test frame (150) populated with additional values. Specifically, both the test frame (150) and the reflected test frame (160) include the sequence number (152) and the NED transmission counter value (154). However, the reflected test frame (160) further includes the FED receiving counter value (166) and the initial FED received count (168). The test frame (150) and the reflected test frame (160) may have additional fields (not shown).

In one or more embodiments of the invention, the test frame (150) and the reflected test frame (160) correspond to the SLM PDU and the SLR PDU of the Y.1731 ETH-SLM protocol with extensions (i.e., additional fields) for the FED receiving counter value (166) and the initial FED received count (168).

Figure 2:
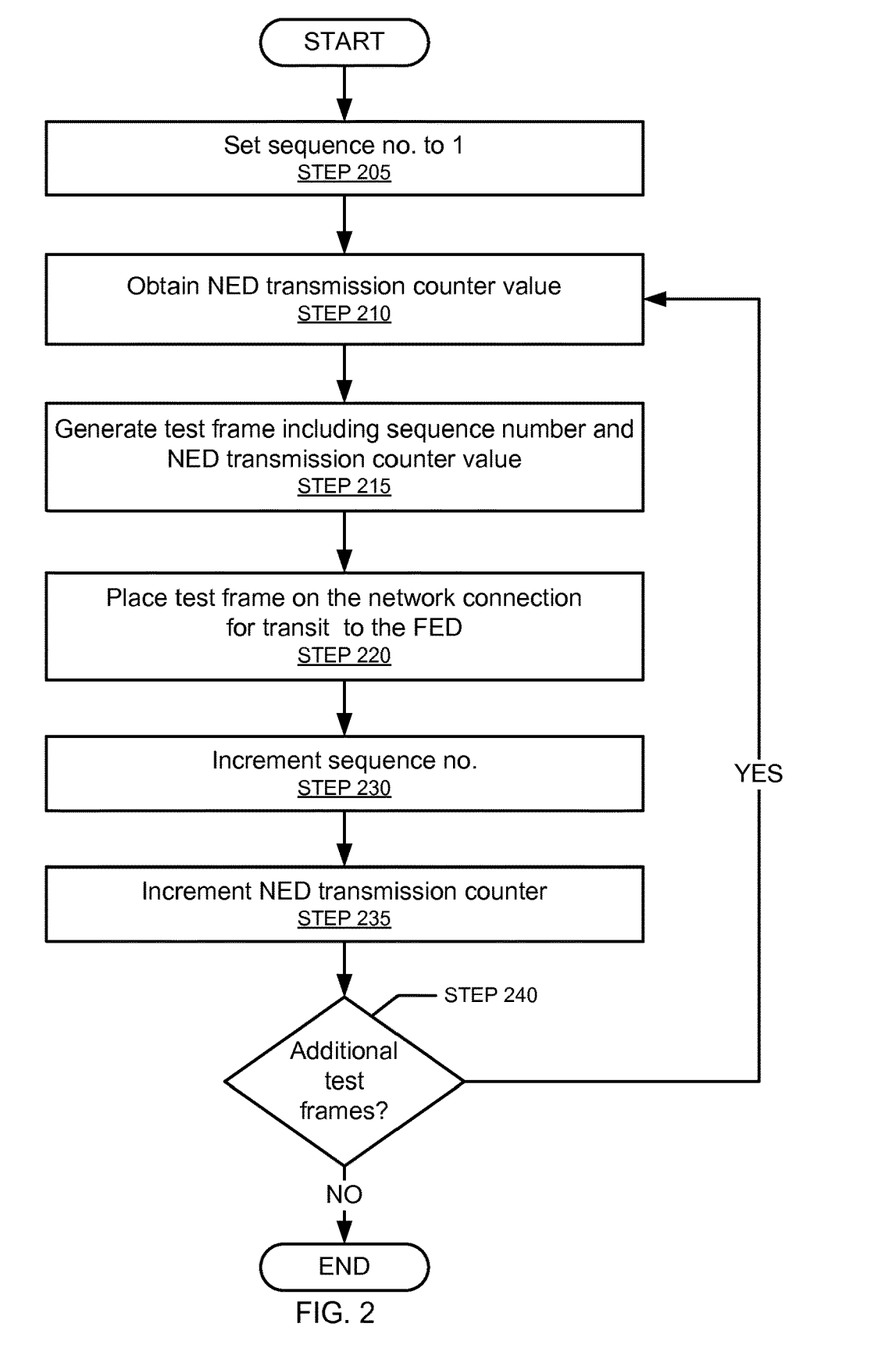
FIG. 2, FIG. 3, and FIG. 4 show flow charts in accordance with one or more embodiments of the invention.

FIG. 2 shows a flowchart in accordance with one or more embodiments of the invention. The flowchart depicts a process for measuring frame loss on a network connection between a NED and a FED during a measurement period. One or more of the steps in FIG. 2 may be performed by the components of the system (100) (e.g., NED (110)), discussed above in reference to FIG. 1A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, the sequence number is set to 1 (STEP 205). The sequence number may be maintained/tracked using a counter. In STEP 210, the current NED transmission counter value is obtained. The current NED transmission counter corresponds to the number of test frames that are placed on the network connection for transmission to the FED.

In STEP 215, a test frame is generated. The test frame includes the current sequence number and the current NED transmission counter value (i.e., the value read from the NED transmission counter). If this is the first test frame for the measurement period, the sequence number is 1.

In STEP 220, the test frame is placed on the network connection for transmission to the FED. As discussed above, the network connection may be an Ethernet connection having wired and/or wireless segments.

In STEP 230, the sequence number is incremented (e.g., by one) in response to placing the test frame on the network connection. As discussed above, the sequence number may be maintained/tracked using a counter and thus increasing the sequence number corresponds to incrementing the counter. Similarly, in STEP 235, the NED transmission counter is incremented (e.g., by one) in response to placing the test frame on the network connection.

In STEP 240, it is determined whether additional test frames are to be generated and placed on the network connection during the measurement period. Specifically, it is determined whether an instruction has been received to terminate the generation of test frames. When it is determined that additional test frames need to be generated, the process returns to STEP 210. When it is determined that no additional test frames need to be generated for the measurement period, the process may end.

Those skilled in the art, having the benefit of this detailed description, will appreciate that following the successful execution of the process shown in FIG. 2, multiple test frames are placed, by the NED, on the network connection for transit to the FED. Each of the test frames has a different (i.e., unique) sequence number and the first test frame has a sequence number of 1. Further, each of the test frames has a different NED transmission counter value.

Figure 3:
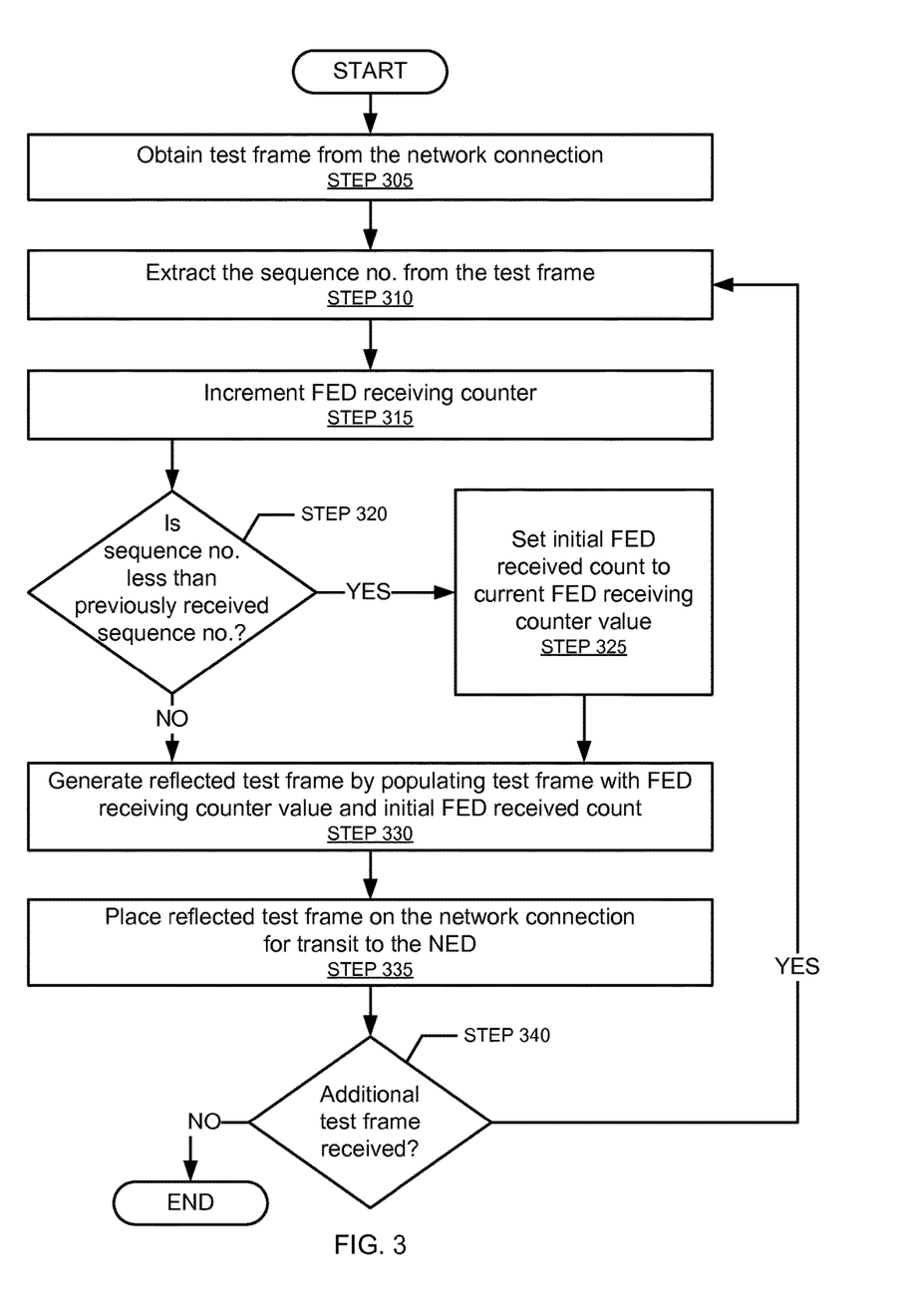

FIG. 3 shows a flowchart in accordance with one or more embodiments of the invention. The flowchart depicts a process for measuring frame loss on a network connection between a NED and a FED during a measurement period. The process depicted in FIG. 3 may be performed during or after the process depicted in FIG. 2. One or more of the steps in FIG. 3 may be performed by the components of the system (100) (e.g., FED (130)), discussed above in reference to FIG. 1A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a test frame is obtained, by the FED, from the network connection (e.g., Ethernet connection) (STEP 305). As discussed above, the test frame is generated by the NED. Moreover, the test frame includes a sequence number and a NED transmission counter value. In STEP 310, the sequence number is extracted from the received test frame.

In STEP 315, the FED receiving counter is incremented to reflect the FED receiving the test frame.

In STEP 320 it is determined whether the sequence number extracted from the test frame is less than the sequence number extracted from the previously received test frame. For example, the FED may store the sequence number of the previously received test frame. If the extracted sequence number (STEP 310) is less than the stored sequence number (i.e., the stored sequence number exceeds the extracted sequence number), this denotes the start of the measurement period to the FED. When it is determined that the extracted sequence number is smaller than the sequence number in the previously obtained test frame, the process proceeds to STEP 325. When it is determined that the extracted sequence number exceeds, or equals, the sequence number in the previously obtained test frame, the process proceeds to STEP 330.

In STEP 325, the initial FED received count is set to the current FED receiving counter value. The initial FED received count will remain constant for the rest of the measurement period.

In STEP 330, a reflected test frame is generated. Specifically, the reflected test frame may be generated by populating the received test frame with the current FED receiving counter value and the initial FED received count (these are may be blank/empty fields in the test frame). Accordingly, the reflected test frame also has a sequence number and a NED transmission counter value. In STEP 335, the reflected test frame is placed, by the FED, on the network connection for transit to the NED.

In STEP 340, it is determined if additional test frames have been received by the FED. When it is determined that additional test frames have been received, the process returns to STEP 310. When it is determined that no additional test frames have been received, the process may end.

Those skilled in the art, having the benefit of this detailed description, will appreciate that following the successful execution of the process shown in FIG. 3, multiple reflected test frames are placed, by the FED, on the network connection for transit to the NED. Each of the reflected test frame has a different (i.e., unique) FED transmission counter value. Further, each of the reflected test frames has the same initial FED received count.

Those skilled in the art, having the benefit of this detailed description, will appreciate that the number of reflected test frames might not equal the number of test frames placed, by the NED, on the network connection for transmission to the FED. Specifically, one or more of the test frames may be lost (i.e., dropped) by the network connection before the test frame(s) reaches the FED.

Figure 4:
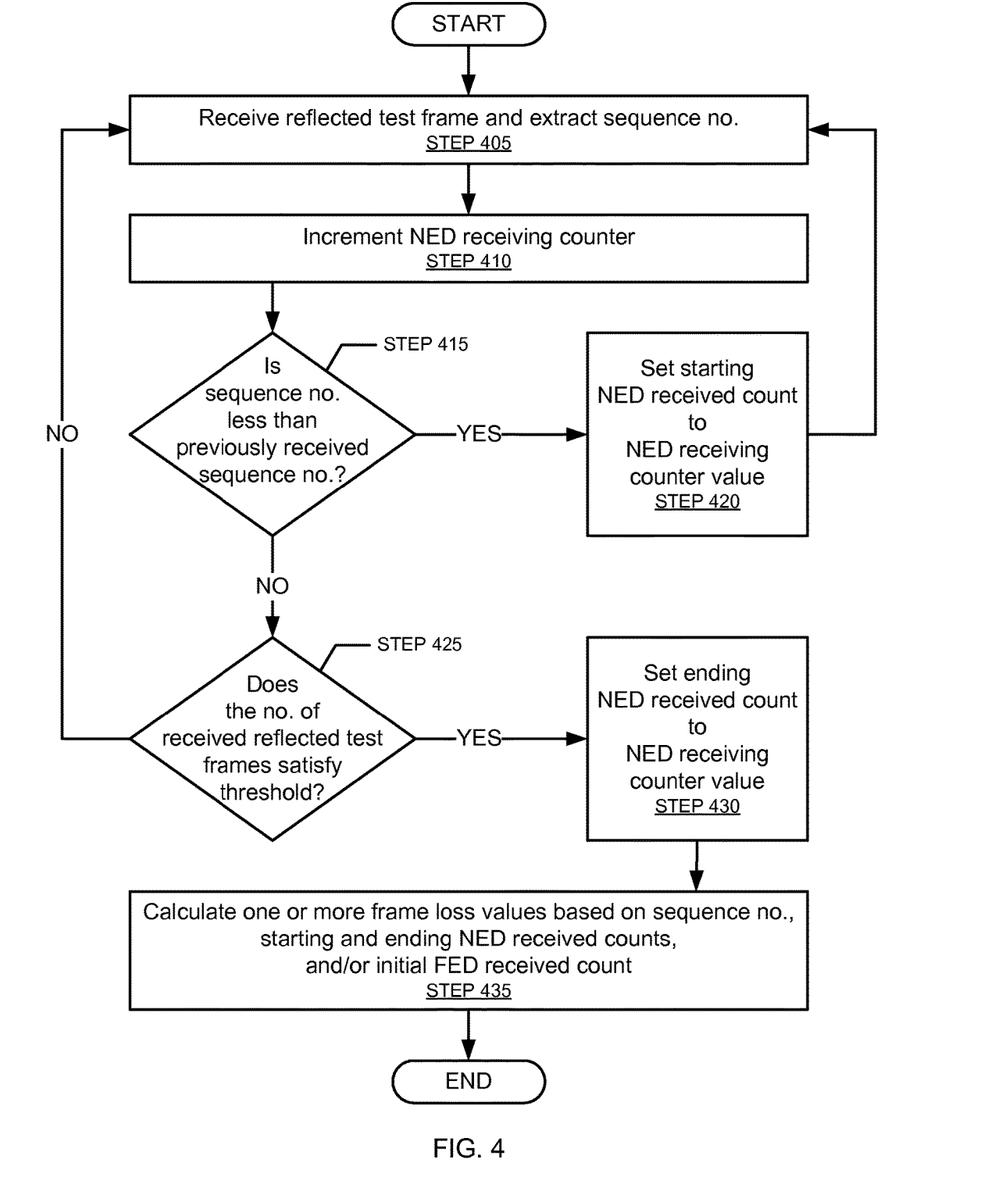

FIG. 4 shows a flowchart in accordance with one or more embodiments of the invention. The flowchart depicts a process for measuring frame loss on a network connection between a NED and a FED during a measurement period. The process depicted in FIG. 4 may be performed during or after the processes depicted in FIG. 2 and FIG. 3. One or more of the steps in FIG. 4 may be performed by the components of the system (100) (e.g., NED (110)), discussed above in reference to FIG. 1A. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, a reflected test frame is obtained, by the NED, from the network connection (STEP 405). Further, a sequence number is extracted from the reflected test frame. In STEP 410, the NED receiving counter is incremented in response to the reflected test frame being obtained.

In STEP 415, it is determined whether the extracted sequence number is smaller than the sequence number in the previously received reflected test frame. If the extracted sequence number (STEP 405) is less than the stored sequence number (i.e., the stored sequence number exceeds the extracted sequence number), this denotes the start of the measurement period to the frame collector of the NED. When it is determined that the extracted sequence number is smaller than the sequence number in the previously obtained reflected test frame, the process proceeds to STEP 420. When it is determined that the extracted sequence number exceeds, or equals, the sequence number in the previously obtained reflected test frame, the process proceeds to STEP 425.

In STEP 420, a starting NED received count is set to the current NED receiving counter value. Then the process may return to STEP 405. The starting NED received count may be used in one or more frame loss value calculations (discussed below).

In STEP 425, it is determined whether the number of received reflected test frames equals or exceeds the threshold necessary to terminate the measurement period. As discussed above, the measurement period terminates when a minimum number (i.e., at least two) of reflected test frames are obtained, by the NED, from the network connection. When it is determined that the threshold is satisfied, the process proceeds to STEP 430. In one or more embodiments, an instruction may be sent to the frame generator to stop generating test frames. When it is determined that the threshold is not satisfied, the process returns to STEP 405.

In STEP 430, the ending NED received count is set to the current NED receiving counter value. The ending NED received count may be used in one or more frame loss value calculations (discussed below).

Those skilled in the art, having the benefit of this detailed description, will appreciate that the number of reflected test frames placed, by the FED, on the network connection might not match the number of reflected test frames obtained, by the NED, from the network connection. Specifically, the discrepancy is the result of one or more reflected test frames being lost (i.e., dropped) by the network connection.

In STEP 435, one or more frame loss values are calculated based on: (i) the sequence number and the FED receiving counter value in the last reflected test frame obtained by the NED; (ii) the starting NED received count; and/or (iii) the ending NED received count. In the following formulas, FL is an abbreviation for frame loss, and FLR is an abbreviation for flame loss ratio.

$Tx_{NearEnd}$=sequence number in the last reflected test frame obtained by the NED $Rx_{NearEnd}$=|ending NED received count−starting NED received count|+1

$Tx_{FarEnd}$=|FED receiving counter value in last reflected test frame obtained by the NED−initial FED received count|+1

$Rx_{FarEnd} = Tx_{FarEnd}$ $FL_{RoundTrip} = |Tx_{NearEnd} - Rx_{NearEnd}|$ $FL_{FarEnd} = |Tx_{NearEnd} - Rx_{FarEnd}|$ $FL_{NearEnd} = |FL_{RoundTrip} - FL_{FarEnd}|$ $FLR_{RoundTrip} = 1 - (Rx_{NearEnd})/(Tx_{NearEnd})$ $FLR_{FarEnd} = (FL_{FarEnd})/(Tx_{NearEnd})$ $FLR_{NearEnd} = (FL_{NearEnd})/(Tx_{FarEnd})$ Any of the calculated values may be output to a user or used to trigger countermeasures in the case of a network connection with high frame loss.

FIG. 5A-5D show examples in accordance with one or more embodiments of the invention. In these examples, test frame X and reflected test frame Y mean the test frame with sequence number X and the reflected test frame with sequence number Y, respectively. In all the examples, there exists a NED (502) and a FED (504). The NED (502) and the FED (504) may be essentially the same as the NED (110) and the FED (130), discussed above in reference to FIG. 1A. Moreover, the NED (502) and the FED (504) are linked by a network connection. Although embodiments disclosed in this detailed description correctly calculate the frame loss values in each example scenario, existing protocols (e.g., Y.1731 ETH-SLM) might not.

Figure 5A:
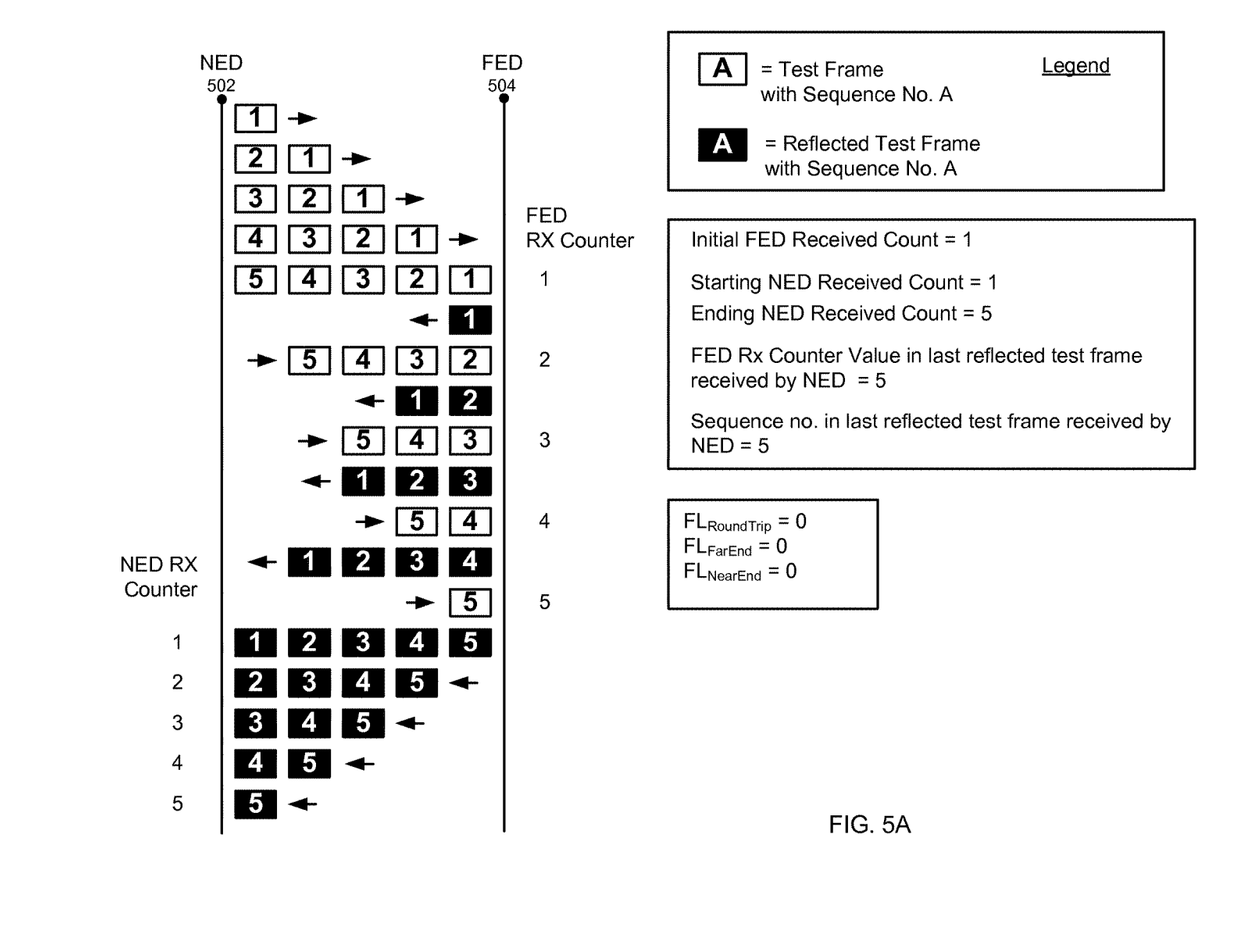
FIGS. 5A-5D show examples in accordance with one or more embodiments of the invention.

In FIG. 5A, the NED (502) places five test frames on the network connection for transit to the FED (504). All five test frames successfully arrive at the FED (504). As each of the test frames arrive at the FED (504), the FED receiving counter increments by one. The initial FED received count, which equals the FED receiving counter value after the first test frame arrives, is 1. Each time a test frame arrives, the FED (504) generates a reflected test frame by populating the test frame with the current FED receiving counter value and the initial FED received count. In other words, all five reflected test frames include the initial FED received count. The FED (504) places each reflected test frame on the network connection for transit to the NED (502).

Still referring to FIG. 5A, all five reflected test frames successfully arrive at the FED (504). As each of the reflected test frames arrive at the NED (502), the NED receiving counter increments by one. The staring NED received count, which equals the NED receiving counter after the first reflected test frame arrives, is 1. The ending NED received count, which equals the NED receiving counter value after the last reflected test frame arrives is 5. The last reflected test frame to arrive has the sequence number 5. Using the formulas above, it is possible for the NED (502) to calculate roundtrip and one-way frame loss values, in addition to a variety of frame loss ratios. In the case of example 5A, all frame loss values are 0.

Figure 5B:
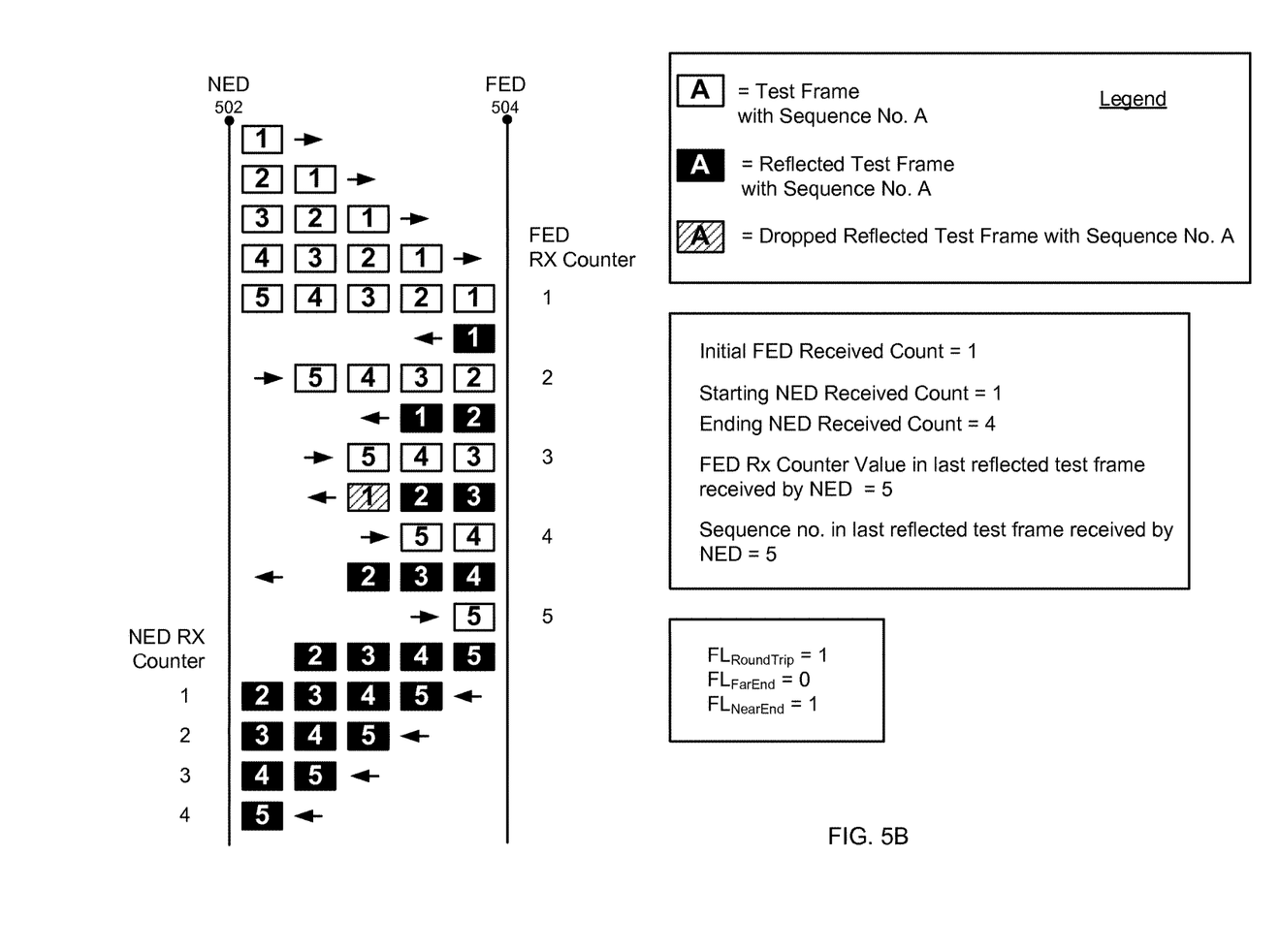

In FIG. 5B, the NED (502) places five test frames on the network connection for transit to the FED (504). All five test frames successfully arrive at the FED (504). As each of the test frames arrive at the FED (504), the FED receiving counter increments by one. The initial FED received count, which equals the FED receiving counter value after the first test frame arrives, is 1. Each time a test frame arrives, the FED (504) generates a reflected test frame by populating the test frame with the current FED receiving counter value and the initial FED received count. In other words, all five reflected test frames include the initial FED received count. The FED (504) places each reflected test frame on the network connection for transit to the NED (502).

Still referring to FIG. 5B, reflected test frame 1 is dropped by the network connection and thus does not arrive at the NED (502). However, the remaining four reflected test frame successfully arrive at the FED (504). As each of the reflected test frames arrive at the NED (502), the NED receiving counter increments by one. The staring NED received count, which equals the NED receiving counter after the first reflected test frame arrives, is 1. The ending NED received count, which equals the NED receiving counter value after the last reflected test frame arrives is 4. The last reflected test frame to arrive has the sequence number 5. Using the formulas above, it is possible for the NED (502) to calculate roundtrip and one-way frame loss values, in addition to a variety of frame loss ratios. In the case of example 5B, the roundtrip frame loss is 1, the one-way frame loss from the FED (504) to the NED (502) is 1, and the one-way frame loss from the NED (502) to the FED (504) is 0.

Figure 5C:
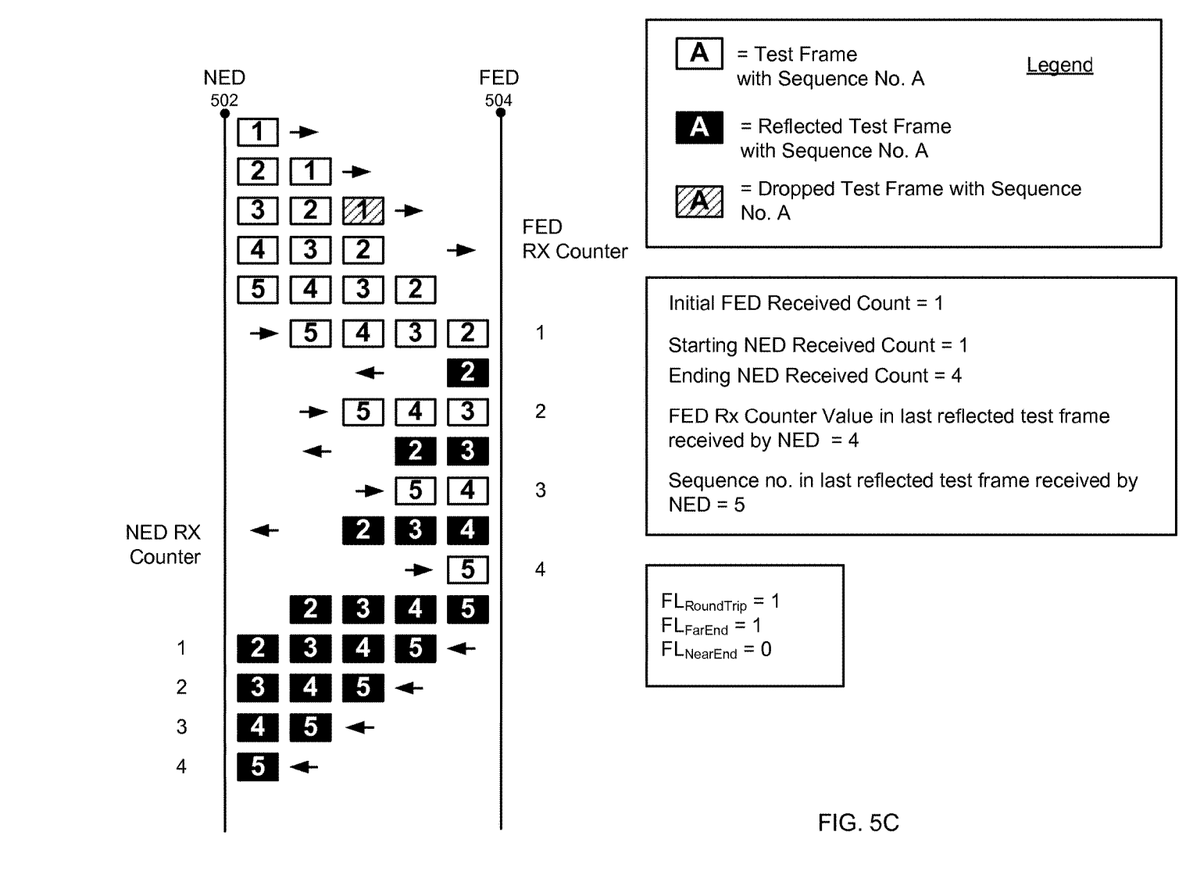

In FIG. 5C, the NED (502) places five test frames on the network connection for transit to the FED (504). Test frame 1 is dropped by the network connection and thus does not arrive at the FED (504). The remaining four test frames successfully arrive at the FED (504). As each of the test frames arrive at the FED (504), the FED receiving counter increments by one. The initial FED received count, which equals the FED receiving counter value after the first test frame arrives, is 1. Each time a test frame arrives, the FED (504) generates a reflected test frame by populating the test frame with the current FED receiving counter value and the initial FED received count. In other words, all four reflected test frames include the initial FED received count. The FED (504) places each reflected test frame on the network connection for transit to the NED (502).

Still referring to FIG. 5C, all four reflect test frames successfully arrive at the FED (504). As each of the reflected test frames arrive at the NED (502), the NED receiving counter increments by one. The staring NED received count, which equals the NED receiving counter after the first reflected test frame arrives, is 1. The ending NED received count, which equals the NED receiving counter value after the last reflected test frame arrives is 4. The last reflected test frame to arrive has the sequence number 5. Using the formulas above, it is possible for the NED (502) to calculate roundtrip and one-way frame loss values, in addition to a variety of frame loss ratios. In the case of example 5B, the roundtrip frame loss is 1, the one-way frame loss from the FED (504) to the NED (502) is 0, and the one-way frame loss from the NED (502) to the FED (504) is 1.

Figure 5D:
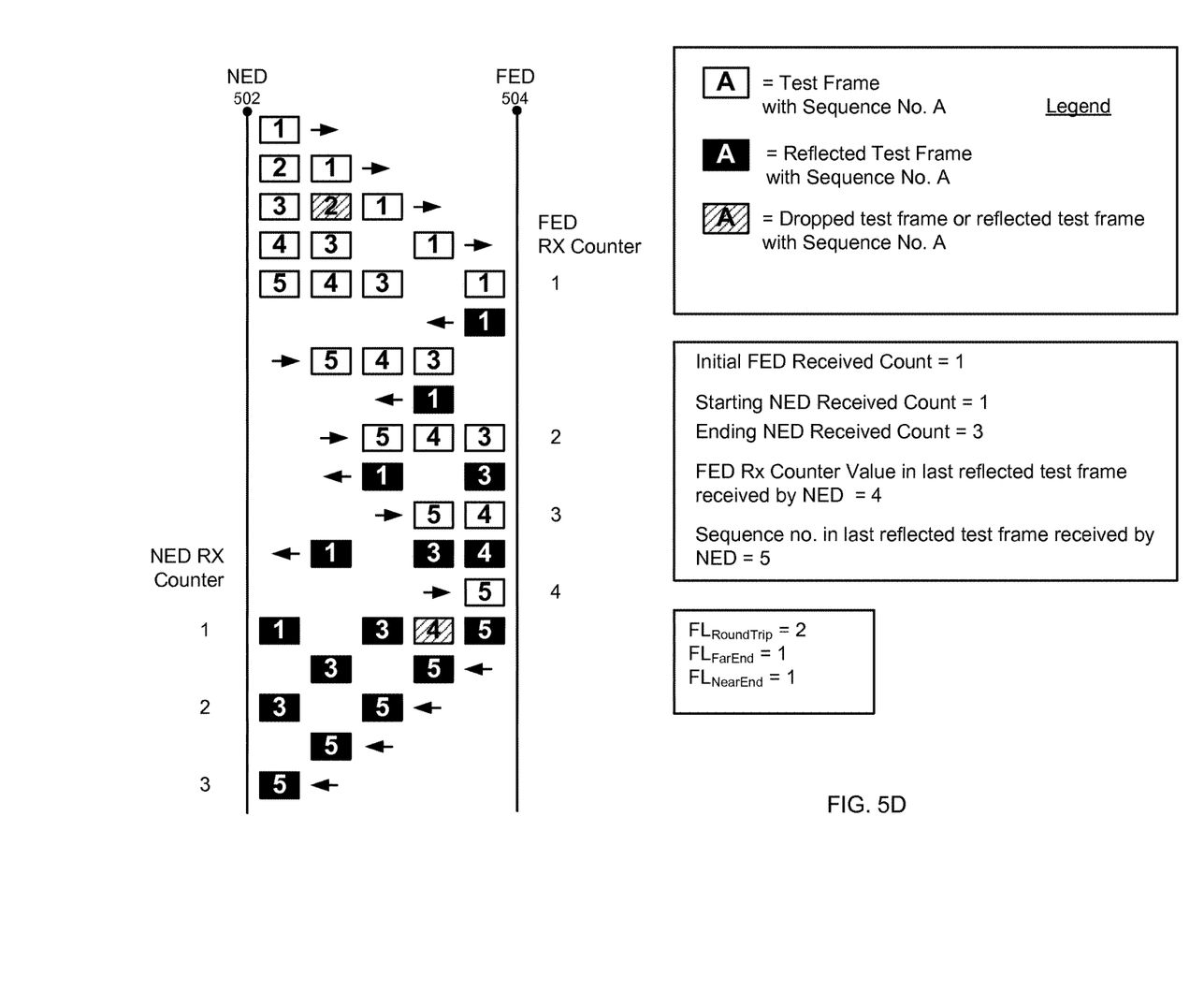

In FIG. 5D, the NED (502) places five test frames on the network connection for transit to the FED (504). Test frame 2 is dropped by the network connection and thus does not arrive at the FED (504). The remaining four test frames successfully arrive at the FED (504). As each of the test frames arrive at the FED (504), the FED receiving counter increments by one. The initial FED received count, which equals the FED receiving counter value after the first test frame arrives, is 1. Each time a test frame arrives, the FED (504) generates a reflected test frame by populating the test frame with the current FED receiving counter value and the initial FED received count. In other words, all four reflected test frames include the initial FED received count. The FED (504) places each reflected test frame on the network connection for transit to the NED (502).

Still referring to FIG. 5D, reflected test frame 4 is dropped by the network connection and thus does not arrive at the NED (502). However, the remaining three reflected test frame successfully arrive at the FED (504). As each of the reflected test frames arrive at the NED (502), the NED receiving counter increments by one. The staring NED received count, which equals the NED receiving counter after the first reflected test frame arrives, is 1. The ending NED received count, which equals the NED receiving counter value after the last reflected test frame arrives is 3. The last reflected test frame to arrive has the sequence number 5. Using the formulas above, it is possible for the NED (502) to calculate roundtrip and one-way frame loss values, in addition to a variety of frame loss ratios. In the case of example 5D, the roundtrip frame loss is 2, the one-way frame loss from the FED (504) to the NED (502) is 1, and the one-way frame loss from the NED (502) to the FED (504) is 1.

One or more embodiments of the invention may have one or more of the following advantages: the ability to calculate roundtrip frame loss by the NED; the ability to calculate one-way frame loss from the NED to the FED by the NED; the ability to calculate one-way from loss from the FED to the NED by the NED; the ability to operate without synchronizing local counters in the NED with local counters in the FED; the ability to use sequence numbers to calculate frame loss values; the ability to use an initial FED received count to calculate frame loss values; the ability to correctly calculate frame loss values when the first test frame or the first reflected test frame is dropped; etc.

Figure 6:
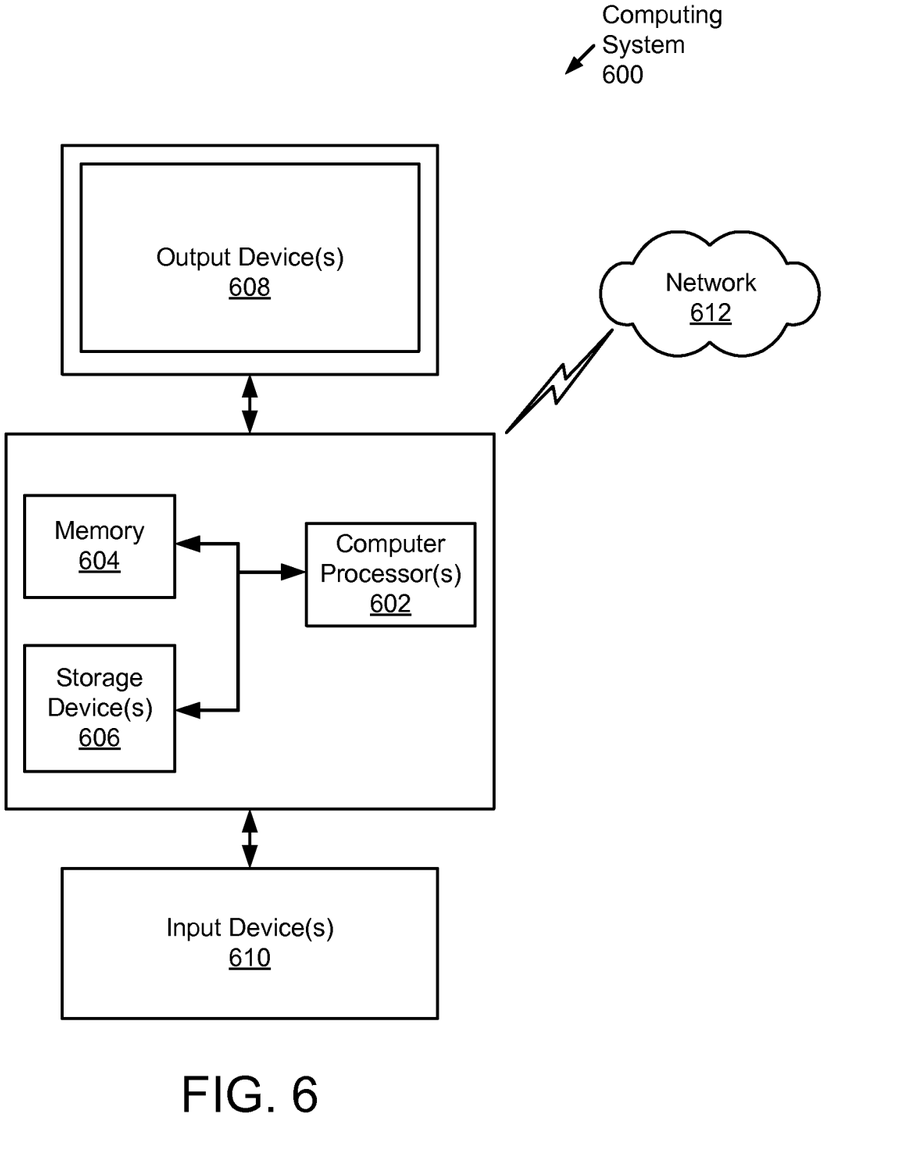
FIG. 6 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (402), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (400) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring frame loss on a network connection between a near-device (NED) and a far-end device (FED) during a measurement period, the method comprising:
    placing, by the NED and on the network connection, a plurality of test frames comprising a first test frame comprising a first unique sequence number and a second test frame comprising a second unique sequence number,
    wherein the plurality of test frames cause the FED to transmit a plurality of reflected test frames back to the NED without synchronizing local counters in the NED with local counters in the FED, the plurality of reflected test frames correspond to a plurality of unique sequence numbers and comprise a first reflected test frame and a second reflected test frame, and
        wherein the FED comprises a FED receiving counter configured to count the number of test frames received by the FED;
    obtaining, by the NED and from the network connection, the first reflected test frame comprising the first unique sequence number, and a first FED receiving counter value from the FED,
        wherein the first FED receiving counter value is a value of the FED receiving counter after receiving the first test frame by the FED;
    obtaining, by the NED and from the network connection, the second reflected test frame comprising a second unique sequence number, a second FED receiving counter value from the FED,
        wherein the second FED receiving counter value is a value of the FED receiving counter after receiving the second test frame by the FED, and;
    extracting, by the NED, the first unique sequence number from the first reflected test frame and the second unique sequence number from the second reflected test frame; and
    calculating, by the NED, a one-way frame loss value from the FED to the NED using the first unique sequence number, the second unique sequence number, the first FED receiving counter value, and the second FED receiving counter value,
    wherein the NED uses the first unique sequence number and the second unique sequence number to determine whether one or more reflected test frames are dropped from the FED to the NED.

2. The method of claim 1, wherein the NED includes a NED receiving counter configured to count the number of the plurality of reflected test frames obtained by the NED from the network connection, the method further comprising:
    incrementing the NED receiving counter to a first NED receiving counter value in response to the NED obtaining the first reflected test frame from the network connection;
    incrementing the NED receiving counter to a second NED receiving counter value in response to the NED obtaining the second reflected test frame from the network connection; and
    terminating the measurement period after the second reflected test frame is the received by the NED.

3. The method of claim 2, further comprising:
    calculating, by the NED, roundtrip frame loss by:
        calculating a difference between the second NED receiving counter value and the first NED receiving counter value;
        incrementing the difference by one; and
        subtracting the difference from the second unique sequence number.

4. The method of claim 2, wherein the one-way frame loss value is a one-way frame loss from the NED to the FED calculated by:
    calculating a difference between the second FED receiving counter value and an initial FED received count;
    incrementing the difference by one; and
    subtracting the difference from the second unique sequence number.

5. The method of claim 4, wherein the one-way frame loss value corresponds to frame loss from the FED to the NED, wherein the one-way frame loss value is calculated by:
    calculating a roundtrip frame loss; and
    subtracting the one-way frame loss from the NED to the FED from the roundtrip frame loss.

6. The method of claim 1, wherein the NED comprises a NED transmission counter configured to count the number of test frames placed by the NED on the network connection for transmission to the FED, the method further comprising:
    incrementing the NED transmission counter in response to placing each of the plurality of test frames on the network connection,
    wherein each of the plurality of test frames comprises a NED transmission counter value read from the NED transmission counter.

7. The method of claim 1, further comprising:
generating, by the FED, the first reflected test frame by populating the first test frame with the first FED receiving counter value and the initial FED received count;
generating, by the FED, the second reflected test frame by populating the second test frame with the second FED receiving counter value and the initial FED received count; and
generating, by the FED, a third reflected test frame by populating a third test frame with the initial FED received count value,
wherein the network connection drops the third reflected test frame after the third reflected test frame is placed on the network connection by the FED.

8. The method of claim 1, further comprising:
identifying, by the FED, a start of the measurement period by comparing a stored unique sequence number with a unique sequence number in an initial test frame received by the FED,
wherein the stored unique sequence number exceeds the unique sequence number in the initial test frame.

9. A non-transitory computer readable medium (CRM) storing instructions for measuring frame loss on a network connection between a near-device (NED) and a far-end device (FED) during a measurement period, the instructions comprising functionality for:
placing, by the NED and on the network connection, a plurality of test frames comprising a first test frame comprising a first unique sequence number and a second test frame comprising a second unique sequence number,
wherein the plurality of test frames cause the FED to transmit a plurality of reflected test frames back to the NED without synchronizing local counters in the NED with local counters in the FED, the plurality of reflected test frames correspond to a plurality of unique sequence numbers and comprise a first reflected test frame and a second reflected test frame, and
wherein the FED comprises a FED receiving counter configured to count the number of test frames received by the FED;
obtaining, by the NED and from the network connection, the first reflected test frame comprising the first unique sequence number, and a first FED receiving counter value from the FED,
wherein the first FED receiving counter value is a value of the FED receiving counter after receiving the first test frame by the FED;
obtaining, by the NED and from the network connection, the second reflected test frame comprising a second unique sequence number, a second FED receiving counter value from the FED,
wherein the second FED receiving counter value is a value of the FED receiving counter after receiving the second test frame by the FED, and;
extracting, by the NED (110), the first unique sequence number from the first reflected test frame and the second unique sequence number from the second reflected test frame; and
calculating, by the NED, a one-way frame loss value from the FED to the NED using the first unique sequence number, the second unique sequence number, the first FED receiving counter value, and the second FED receiving counter value,
wherein the NED uses the first unique sequence number and the second unique sequence number to determine whether one or more reflected test frames are dropped from the FED to the NED.

10. The non-transitory CRM of claim 9, wherein the NED includes a NED receiving counter configured to count the number of the plurality of reflected test frames obtained by the NED from the network connection, and the instructions further comprising functionality for:
incrementing the NED receiving counter to a first NED receiving counter value in response to the NED obtaining the first reflected test frame from the network connection;
incrementing the NED receiving counter to a second NED receiving counter value in response to the NED obtaining the second reflected test frame from the network connection; and
terminating the measurement period after the second reflected test frame is received by the NED.

11. The non-transitory CRM of claim 10, the instructions further comprising functionality for:
calculating a roundtrip frame loss by:
calculating a difference between the second NED receiving counter value and the first NED receiving counter value;
incrementing the difference by one; and
subtracting the difference from the second unique sequence number.

12. The non-transitory CRM of 10, wherein the one-way frame loss value is a one-way frame loss from the NED to the FED calculated by:
calculating a difference between the second FED receiving counter value and an initial FED received count;
incrementing the difference by one; and
subtracting the difference from the second unique sequence number.

13. The non-transitory method of claim 12, wherein the one-way frame loss value corresponds to frame loss from the FED to the NED, wherein the one-way frame loss value calculated by:
calculating a roundtrip frame loss; and
subtracting the one-way frame loss from the NED to the FED from the roundtrip frame loss.

14. The non-transitory CRM of claim 9, wherein the NED comprises a NED transmission counter configured to count the number of test frames placed by the NED on the network connection for transmission to the FED, the instructions further comprising functionality for:
incrementing the NED transmission counter in response to placing each of the plurality of test frames on the network connection,
wherein each of the plurality of test frames comprises a NED transmission counter value read from the NED transmission counter.

15. A system for measuring frame loss on a network connection between a near-device (NED) and a far-end device (FED) during a measurement period, the system comprising:
a frame generator located within the NED and comprising circuitry configured to place, on the network connection, a plurality of test frames comprising a first test frame comprising a first unique sequence number and a second test frame comprising a second unique sequence number,
wherein the plurality of test frames are configured to cause the FED (130) to transmit a plurality of reflected test frames back to the NED (110) without synchronizing local counters in the NED (110) with local counters in the FED (130), the plurality of reflected test frames correspond to a plurality of unique sequence numbers and comprise a first reflected test frame and a second reflected test frame; and
a FED receiving counter located within the FED and configured to count the number of test frames received by the FED;
a frame collector located within the NED and comprising circuitry configured to:
obtain, from the network connection, the first reflected test frame comprising the first unique sequence number, and a first FED receiving counter value from the FED,
and
wherein the first FED receiving counter value is the value of the FED receiving counter after receiving the first test frame by the FED;
obtain, from the network connection, a second reflected test frame comprising the second unique sequence number, and a second FED receiving counter value from the FED,
wherein the second FED receiving counter value is the value of the FED receiving counter after receiving the second test frame by the FED;
extract the first unique sequence number from the first reflected test frame and the second unique sequence number from the second reflected test frame; and
calculate a one-way frame loss value from the FED to the NED using the first unique sequence number, the second unique sequence number, the first FED receiving counter value, and the second FED receiving counter value,
wherein the NED uses the first unique sequence number and the second unique sequence number to determine whether one or more reflected test frames are dropped from the FED to the NED.

16. The system of claim 15, further comprising:
a reflected frame generator located within the FED and comprising circuitry configured to generate the first reflected test frame and the second reflected test frame,
wherein the FED receiving counter is further configured to:
increment in response to the FED receiving the first test frame; and
increment in response to the FED receiving the second test frame.

17. The system of claim 15, further comprising:
a NED receiving counter located within the NED and configured to count the number of the plurality of reflected test frames obtained by the NED from the network connection and further configured to:
increment to a first NED receiving counter value in response to the NED obtaining the first reflected test frame from the network connection; and
increment to a second NED receiving counter value in response to the NED obtaining the second reflected test frame from the network connection,
wherein the second reflected test frame is the last reflected test frame received by the NED for the measurement period.

18. The system of claim 17, wherein the one way frame loss value corresponds to at least one selected from a group consisting of frame loss from the FED to the NED and frame loss from the NED to the FED.

19. The system of claim 18, wherein the frame loss from the NED to the FED is calculated by:
calculating a difference between the second FED receiving counter value and the initial FED received count;
incrementing the difference by one; and
subtracting the difference from the second unique sequence number.

20. The system of claim 15, wherein the network connection is an Ethernet connection.

* * * * *